US008001604B2

(12) United States Patent
Fried et al.

(10) Patent No.: US 8,001,604 B2
(45) Date of Patent: Aug. 16, 2011

(54) METHOD AND APPARATUS FOR MASKING CHILD USER AUTHORIZATIONS FROM ADVERSE USE AGAINST A PARENT USER

(75) Inventors: Eric P. Fried, Austin, TX (US); Vijayasekhar Mekala, Andhra Pradesh (IN); Rajeev Mishra, Bangalore (IN); Manjunath A. Pattanshetti, Rajajinagar Bangalore (IN); Suresh Sabarathinam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 952 days.

(21) Appl. No.: 11/935,638

(22) Filed: Nov. 6, 2007

(65) Prior Publication Data
US 2009/0119783 A1    May 7, 2009

(51) Int. Cl.
G06F 11/00 (2006.01)
G06F 7/04 (2006.01)
G06F 17/30 (2006.01)
H04L 12/28 (2006.01)
G06F 1/00 (2006.01)
G06F 7/00 (2006.01)

(52) U.S. Cl. ............. 726/25; 726/28; 370/408; 707/783
(58) Field of Classification Search ............... 726/25, 726/28; 370/408
See application file for complete search history.

(56) References Cited

U.S. PATENT DOCUMENTS

| 6,944,613 B2 | 9/2005 | Lef et al. |
| 7,062,500 B1 | 6/2006 | Hall et al. |
| 7,143,066 B2 | 11/2006 | Shear et al. |
| 7,216,125 B2 | 5/2007 | Goodwin |
| 2002/0169956 A1 | 11/2002 | Robb et al. |
| 2006/0101525 A1* | 5/2006 | Hiroi et al. ............ 726/28 |
| 2008/0063003 A1* | 3/2008 | O'Neal ............ 370/408 |

FOREIGN PATENT DOCUMENTS
WO    WO 2004109480 A2 * 12/2004

OTHER PUBLICATIONS

H. M. Gladney, "Access control for large collections", Apr. 1997, Transactions on Information Systems (TOIS), vol. 15 Issue 2, Publisher: ACM; pp. 154-194.*

* cited by examiner

Primary Examiner — Eleni A Shiferaw
Assistant Examiner — Courtney D Fields
(74) Attorney, Agent, or Firm — Robert C. Rolnik; David A. Mims (57) ABSTRACT

The present invention provides a computer implemented method, data processing system, and computer program product to protect a first user from authorization limitation by a second user. The computer may receive an authorization command from the second user, wherein the authorization command targets the first user, and the second user is at least partially authorized to operate the authorization command. The computer determines that the first user is an ancestor user of the second user. In addition, the computer, responsive to a determination that the first user is an ancestor user of the second user, prevents operation of code of the authorization command to change an authorization of the first user.

17 Claims, 4 Drawing Sheets

METHOD AND APPARATUS FOR MASKING CHILD USER AUTHORIZATIONS FROM ADVERSE USE AGAINST A PARENT USER

BACKGROUND OF THE INVENTION

1. Field of the Invention

The present invention relates generally to a computer implemented method, data processing system, and computer program product for controlling access to data processing system resources. More specifically, the present invention relates to permitting a user to grant privileges to a child user, but limiting those privileges to avoid a child removing privileges of the user.

2. Description of the Related Art

Modern computers and networks of computers may provide multiple levels and gradations of authority for users to use within the computer or network. An authorization is a key that enables a function for use by a user within a data processing system. The authorization may be grouped with other authorizations to form, collectively, a role. A role is one or more authorizations in combination. Authorization may be assigned from one user to a second user. Depending on the data processing system, an authorization may be assigned to a user by assigning a role to the user, where the role includes the authorization. Thus, for a group of users, as related to a specific function, some users may be authorized to use the function, and some users may not be authorized to use the function. The first group of users are said to be assigned an authorization corresponding to the function.

Users of the computer are created in a hierarchy. A first user can create a second user. A parent-child relationship is a relative term that indicates that between a first user and a second user, one user directly created the second user. In this example, the first user is the parent user of the second user.

Examples of some authorizations that may be assigned to a user include an authorization "aix.security.user.remove" to use "rmuser", an AIX® command to remove a user specified on the command line. AIX® is a trademark of International Business Machines Corporation in the United States, other countries or both. A second example is an authorization "aix.security.user.change" to use "chuser" an AIX® command to change attributes of a user specified on the command line. One of the attributes of the user is the roles assigned to the user. The command "chuser" is used to remove roles from a user or add roles to a user. Since a role is a collection of authorizations, removing a role from a user through "chuser" command actually removes one or more authorizations from the user.

Some challenging aspects to granting authorization to a user revolve around preserving the authorizations of the parent user of the user receiving the assigned authorizations. For example, in conventional systems, a user, for example, named user-B, creates a child user, named, for example, user-C. User-B also assigns authorizations to user-C to access the commands "rmuser" and "chuser", the command to remove users and the command to change user attributes, respectively. Such an arrangement can permit user-C to stage a coup of sorts. For example, user-C may execute "rmuser user-B," effectively eliminating the user account and authority of user-B. Another anomalous power of user-C is the ability to establish a permanent appointment by diminishing the roles (or authorizations indirectly) of user-B. For example, assume that user-B has two roles R1 and R2 associated with "aix.fs.create" and "aix.fs.remove", respectively. Aix.fs.create authorizes creating file systems, using, for example, a command "mkfs." Aix.fs.remove authorizes removing file systems, for example, using the command, "rmfs." User-C may execute "chuser roles=-R2 user-B", effectively removing role R2 from user-B. Breaking the association of user-B to role R2 disables user-B from removing any file systems. Consequently, user-B cannot execute rmfs command. The data processing system blocks user-B access to rmfs by removing "aix.fs.remove" from user-B. Moreover, if user-C has been given authorization to create further users, each of these users might be assigned similar authorizations such that these users could similarly remove authorization of the ancestors to such users, for example, user-B.

When a set of authorizations are grouped together to form a named role it can be helpful to exclude, on an authorization-by-authorization basis, one or more authorizations. This exclusion can be helpful in instances where a worker is temporarily assigned a task within the data processing system. It could be burdensome to assign a role for such an ad hoc arrangement.

Thus, a role having certain authorizations masked out could achieve some benefits. In addition, a need exists to provide a user with a mechanism to exclude descendant users from applying authorizations against the user.

SUMMARY OF THE INVENTION

The present invention provides a computer implemented method, data processing system, and computer program product to protect a first user from authorization limitation by a second user. The computer may receive an authorization command from the second user, wherein the authorization command targets the first user, and the second user is at least partially authorized to operate the authorization command. The computer determines that the first user is an ancestor user of the second user. In addition, the computer, responsive to a determination that the first user is an ancestor user of the second user, prevents operation of code of the authorization command to change an authorization of the first user.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
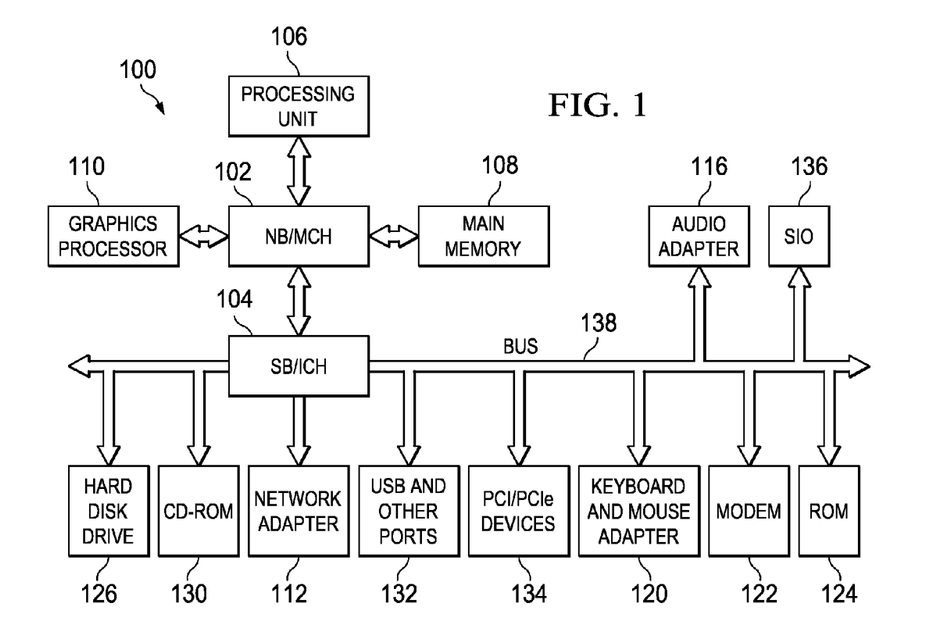
FIG. 1 shows a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106 and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The aspects of the illustrative embodiments provide a computer implemented method, data processing system, and computer program product for masking or otherwise inhibiting specific authorizations within a role from being accessible to a user with respect to a parent user. In addition, some embodiments may recursively apply such a mask to successive generations of users created directly or indirectly by a user. Consequently, a user can achieve some immunity from adverse changes to authorizations of the user, at least with respect to descendant users of the user.

Figure 2A:
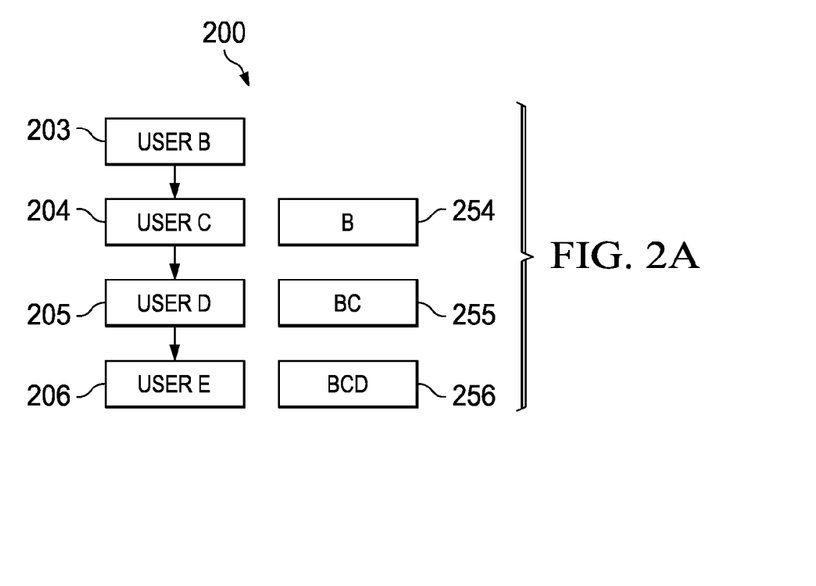
FIG. 2A shows a simple hierarchy of users in a directed graph in accordance with an illustrative embodiment of the invention.

FIG. 2A shows a simple hierarchy of users in a directed graph in accordance with an illustrative embodiment of the invention. In this example, users are named B 203, C 204, D 205, and E 206. The directed graph can be implemented as linked list 200. Associated with each user are ancestor sets. The ancestor set of E 206 is BCD 256. The ancestor set of D 205 is BC 255. The ancestor set of C 204 is B 254. An ancestor set is the set of all ancestors of a user. Each ancestor user may be associated within an ancestor set. The ancestor set may be stored, for example, as an array, linked list, table or the like.

Figure 2B:
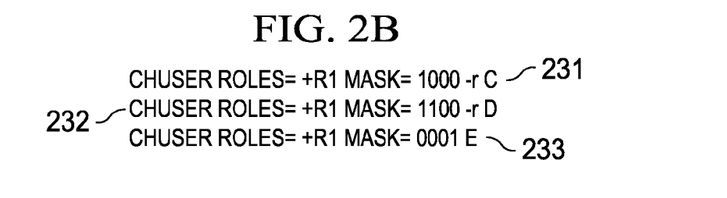
FIG. 2B shows exemplary commands for setting authorizations in accordance with an illustrative embodiment of the invention.

FIG. 2B shows a set of exemplary commands in accordance with an illustrative embodiment of the invention. User B sets roles for user C with command 231. User C sets roles for user D with command 232. User D sets roles for user E with command 233. Roles for each user may be established by use of a command line interface, or by graphical user interface. The examples below describe role setting by a user inputting commands at a command line using command masks.

A command mask is a mask set by a user when entering input to change or establish authorization of a second user. Such input, coupled with an authorization command, changes authorizations with respect to a target user. An authorization command is a command or other input by a user that, if executed in the least restrictive environment, permits a user to change authority of a second user to access functions of the data processing system. The command mask may be entered, for example, at a command line, as described above. The command mask may be a bit field, for example, 1100, wherein each bit position indicates whether a corresponding authorization is permitted, relative to a targeted user.

A bit field is comprised of bits located in bit positions. A bit position is an ordered location in a sequence of bits. A bit position may be, for example, a first bit position, a left-most bit position, most significant bit, and the like. For purposes of bits shown in the form 0000, the first bit position is the left-most bit position and the most significant bit. The bit position right of that first bit position is the second bit position. For example, a bit field, "1100", may associate bits from first bit position through last bit position with authorizations. An authorization associated with the first bit can be, for example, "aix.security.user.change" used to execute chuser command. An authorization associated with the second bit through fourth bit can be, for example, "aix.security-.role.change" used to execute chrole command; "aix.security-.auth.change" used to execute chauth command; and "aix.security.user.remove" used to execute rmuser command, respectively. Thus, a bit field "1100" may serve to mask the chuser and the chrole functions from use by the target user against the user's ancestors.

An authorization mask is a bit field associated with a user that is a child of another user. The child user is the target of a command entered by the parent user, wherein the parent user sets the authorization mask explicitly with the command mask, or implicitly by combining the command mask with a recursive authorization mask. The authorization mask associated with a user indicates which authorizations a user is prohibited from executing with respect to ancestors of the user. A recursive authorization mask is a bit field associated with a parent-child relationship such that for each bit set, an associated authorization is suppressed from being applied against the parent user by any child user or descendant user of the child user. Moreover, the bit also indicates, with respect to the associated authorization, that neither the child user nor the descendant users of the child user may apply the associated authorization against an ancestor user of the parent user. Consequently, the recursive authorization mask may indicate, directly or indirectly, suppressed access to authorization for all descendants of the target user. The difference between an authorization mask and a recursive authorization mask is that the authorization mask is applied to limit authorizations of a specific user, while the recursive authorization mask is applied to the specific user as well as all offspring users of the specific user. In other words, the recursive authorization mask can propagate down generations of users, while the authorization mask propagates down one user.

Thus, in the examples of FIG. 2B above, E inherits an authorization mask that was made by logical ORing (a) the recursive authorization mask of a parent user with (b) the command mask. In addition, if a recursive flag is set on the command line, E inherits a recursive authorization mask that was made by logical ORing (a) the recursive authorization mask of a parent user with (b) the command mask. Absent a recursive flag, a data processing system causes E to inherit the recursive authorization mask of the parent user. A parent user is a relative term that describes a relationship between a first user that directly created a second user, such that the first user occupies the position of parent user of the second user. Similarly, the second user occupies the position of child user of the first user. An ancestor user is a relative term that indicates, between two users, that a first user occupies a position of influencing the creation of the second user, such that the first user is known as an ancestor user of the second user. In a first situation, an ancestor user can directly influence the creation of a second user by entering a create command to create the second user. In a second situation, the ancestor can indirectly influence the creation of the second user by entering a create command of a parent or other ancestor of the second user. In the first situation, the ancestor user has a parent-child relationship to the second user. In the second situation, the ancestor has an ancestor-offspring relationship to the second user. Conversely, in the relationship described above, a descendant user is the second user. In other words, the descendant user is a child user or other offspring of a user to which it is a descendant.

As described above, a command may include a recursive flag. A recursive flag is a flag to recursively apply the authorization. A recursive flag may be set on a command line, for example, using a string "–r". A recursive flag may be set using a graphical user interface, for example, providing a user selectable button to opt for selecting a "recursive" option.

An antecedent user is a relative term that indicates between two users, that a first user influences the creation of the second user, such that the first user is known as an antecedent user of the second user. The antecedent user has a parent-child relationship to the second user or an ancestor relationship to the second user.

Figure 2C:
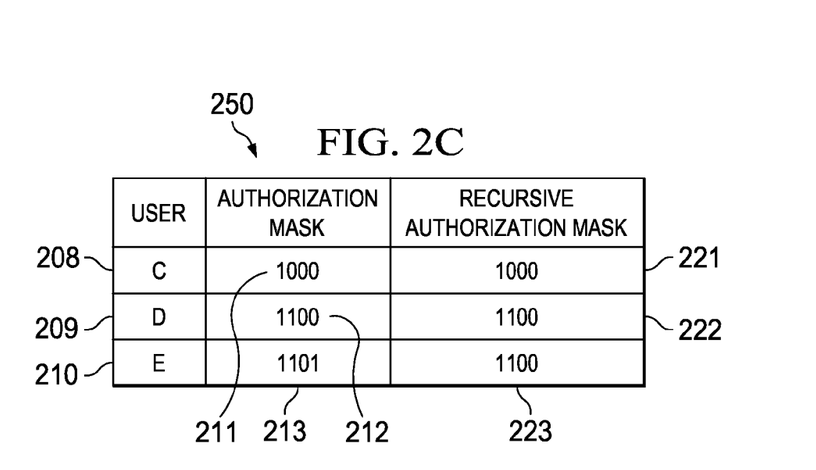
FIG. 2C shows a data structure for recursive authorization masks and authorization masks in accordance with an illustrative embodiment of the invention.

FIG. 2C shows a data structure for recursive authorization masks and authorization masks in accordance with an illustrative embodiment of the invention. User B created user C. User C created user D. User D created user E. B is the parent user of C. Consequently, each user provides authorizations for the respective child user. Table 250 may be formed by multiple operations of the "chuser" command. In addition, table 250 may be associated with a role. In the examples below, the role is named "R1".

For example, user B sets roles for user C using command 231 of FIG. 2B. The command implements command line parameters, such as, +R1 is an indication to add role "R1", "1000" is the mask to be applied, "–r" is a flag to apply the mask as a recursive mask, and "C" is the target user name. Accordingly, the command instructs the data processing system to add R1, masking the first authorization within role R1, recursively, to user C 208. Recursive authorization mask 221 is added to a table field corresponding to user C 208. Recursive authorization mask 221 is an indicator that C, and descendants of C, are prohibited from using the first authorization against their ancestors. Authorization mask 211 is an indicator that the first authorization of the associated role is prohibited to be used by C against ancestors of C.

As a further example, user C sets roles for user D using command 232 of FIG. 2B. The command implements command line parameters, such as, +RI is an indication to add role "R1", "1100" is the mask to be applied, "–r" is a flag to apply the mask as a recursive authorization mask, and "D" is the target user name. Accordingly, the command instructs the data processing system to add R1, masking the first and second authorizations within role R1, recursively, to user D. Recursive authorization mask 222 is added to a table corresponding to user D 209. Recursive authorization mask 222 indicates that D, and descendants of D, are prohibited from using first authorization and second authorization of the associated role against their ancestors. Authorization mask 212 is an indicator that the first authorization and second authorization of the associated role are prohibited to be used by D against ancestors of D.

As a final example, user D sets roles for user E using command 233 in FIG. 2B. Entries associated with user E in table 250 are updated accordingly. Command 233 implements command line parameters, such as, +R1 is an indication to add role "R1", "mask=0001" is the command mask, and "E" is the target user name. Accordingly, the command instructs the data processing system to add R1, masking one of the authorizations. Recursive authorization mask 223 is added to the table corresponding to user E 210. Recursive authorization mask 223 remains the same as recursive authorization mask 222, since in this case, no recursive flag was set in command 233. However, authorization mask 213 is created by logically 'OR' ing the parent user, D's, recursive authorization mask 222 with the command mask, 0001. In this example, recursive authorization mask 222 is a source recursive authorization mask in the sense that D is the parent or source of the authorizations in command 233. A source recursive authorization mask is the recursive authorization mask of a source user, where the source user is the user entering an authorization command.

Figure 3:
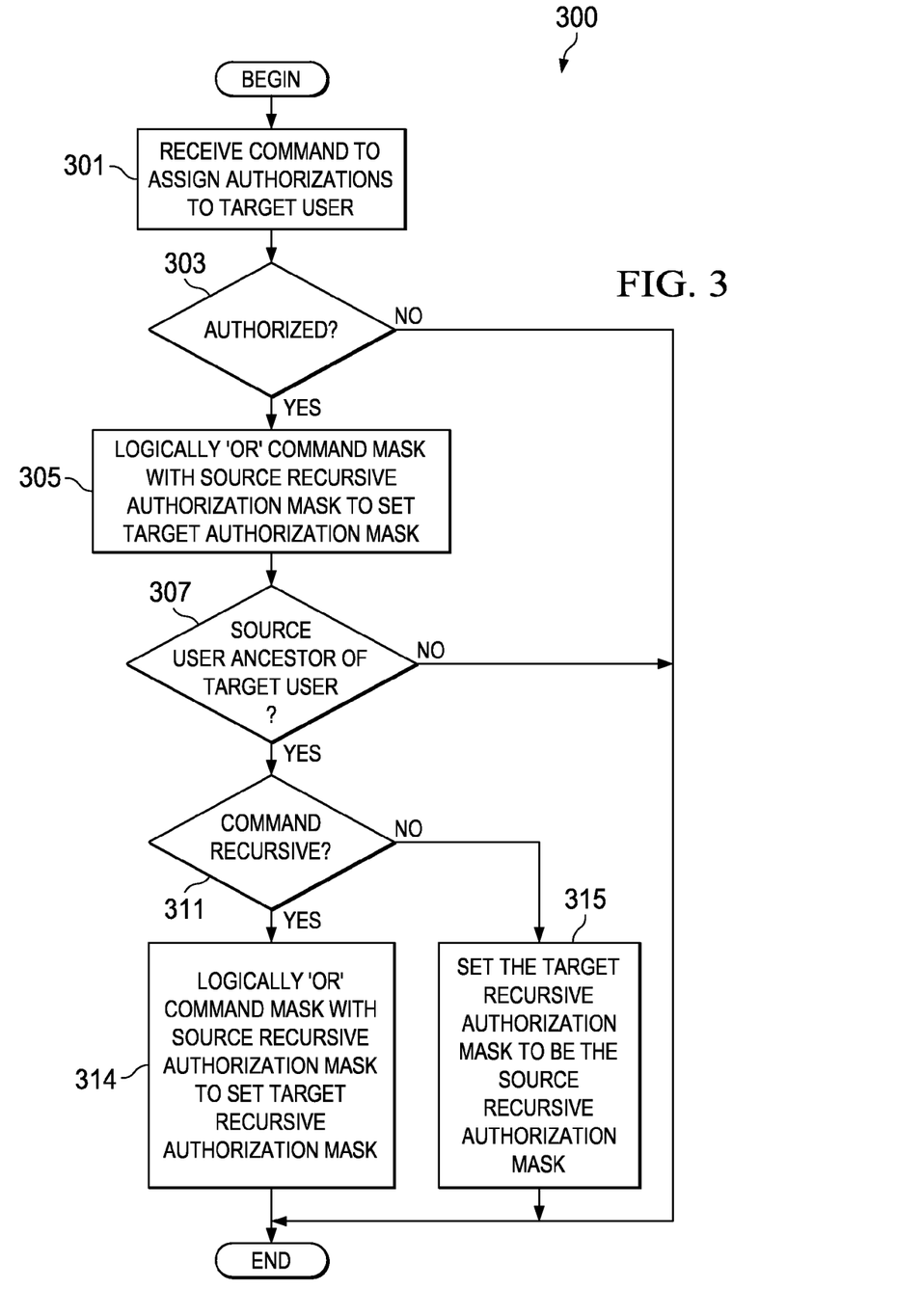
FIG. 3 shows a flowchart of steps to assign authorizations to a target user in accordance with an illustrative embodiment of the invention.

FIG. 3 shows a flowchart of steps to assign authorizations or otherwise change authorizations of a target user in accordance with an illustrative embodiment of the invention. Flowchart 300 applies to commands that specify a target user. Initially, a data processing system receives a command to assign authorizations to a target user (step 301). A source user is the user that enters the command, through, for example, a keyboard. The data processing system may be, for example, data processing system 100 of FIG. 1. Next, the data processing system determines whether the source user is authorized, generally, to perform the command (step 303). A positive determination to step 303 causes the data processing system to logically OR the command mask with the source recursive authorization mask to set an authorization mask of the target user (step 305). Next, the data processing system determines whether the source user is an ancestor of the target user (step 307). If not, then processing terminates thereafter.

However, a positive determination to step 307 causes the data processing system to determine whether the command is recursive (step 311). If the command is recursive, for example, –r on the command line, then the data processing system applies the command mask with the source recursive authorization mask to set the target recursive authorization mask (step 314). In other words, the target recursive authorization mask can be written to the data structure of FIG. 2C. However, if the result of step 311 is negative, the data processing system sets the target recursive authorization mask to be the source recursive authorization mask (step 315). In other words, the target recursive authorization mask set at step 315 is no more limiting than the source recursive authorization mask. The added role may be coupled to the applicable user by using the file, /etc/security/user.roles, in a data processing system supporting, for example, AIX®. Processing terminates after steps 314 and 315.

A negative determination at step 303 causes the data processing system to terminate thereafter.

Figure 4:
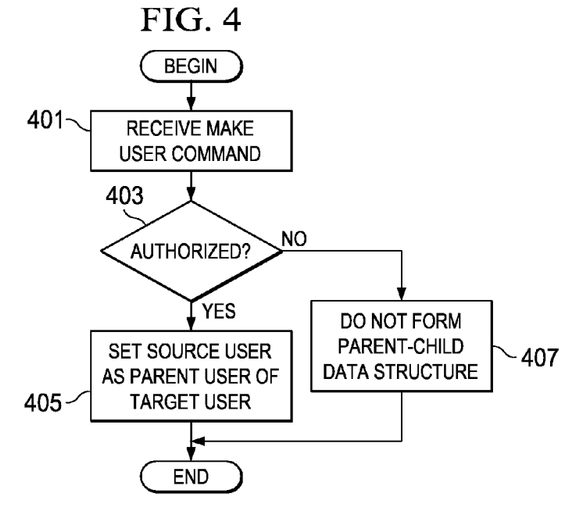
FIG. 4 is a flowchart of steps to form a user as a child user of a parent user in accordance with an illustrative embodiment of the invention.

FIG. 4 is a flowchart of steps to form a user as a child user of a parent user in accordance with an illustrative embodiment of the invention. Initially the data processing system receives a "make user" command (step 401). The source user is the user that inputs the "make user command." In the AIX® operating system, the make user command is "mkuser." Next, the data processing system determines if the source user is authorized to perform the command (step 403). If the source user is authorized, then the data processing system sets the source user as a parent user of the target user (step 405). Determining authorization sub-steps are explained below with reference to FIG. 5. The data processing system sets the source user as a parent user to the target user by forming an ancestor set stored in a data structure. The ancestor set of the child user may be a superset of the parent user's ancestor set. The ancestor set of the child user is one user larger than the parent user's ancestor set, namely the ancestor set of the child user includes the parent user. The data structure may be, for example, a linked list of parent-child relationships that link the target user to a root user or other top-tier ancestor, for example, linked list 200 of FIG. 2A. Alternatively, the data structure may be a tree that provides a one-to-many cardinality between parent users and children users. It is appreciated that still other data structures may record the ancestry of a target user.

However, a negative result to step 403 causes the data processing system to not form a parent-child data structure of the target user (step 407). Attendant with step 407, the data processing system may issue an error. Processing terminates thereafter.

Figure 5:
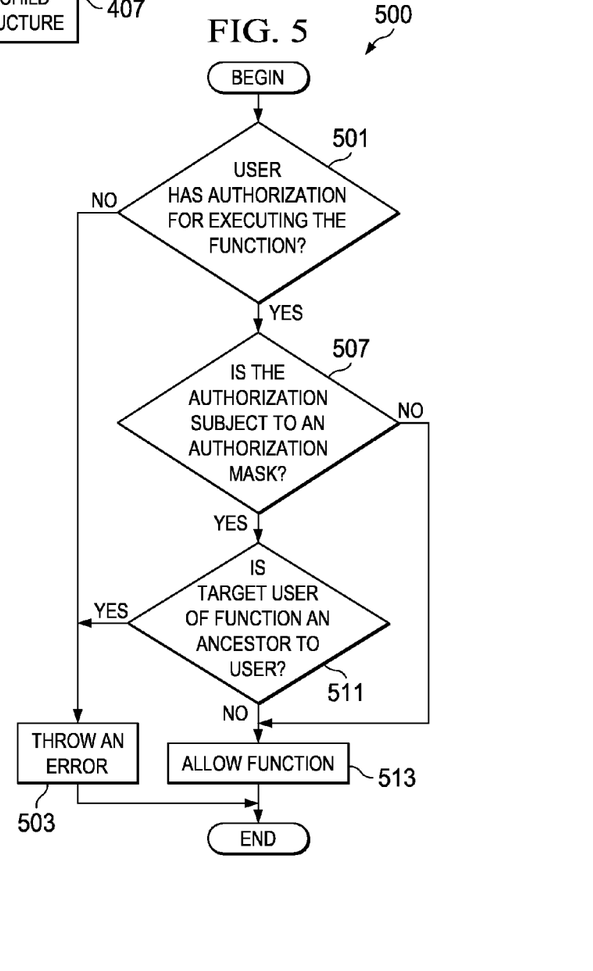
FIG. 5 is a flowchart that details how the data processing system may determine if a function is authorized in accordance with an illustrative embodiment of the invention.

FIG. 5 is a flowchart that details how the data processing system may determine if a function is authorized in accordance with an illustrative embodiment of the invention. Collectively the steps are determining authorization 500. Initially, the data processing system determines if the user has authorization for executing the function (step 501). The data processing system may lookup the authorization based on the user identifier in, for example, a file called /etc/security/user.roles. Such a file may be conveniently available in data processing systems that support AIX® operating system. The authorization for executing a command may be stored in /etc/security/privcmds file for every command based on the absolute path name of the command. A data processing system can check whether the authorization required to execute the command is present and that the user is associated with an appropriate role. The role association with the user may be available, for example, in an AIX® file, /etc/security/user.roles. A negative result to step 501 causes the data processing system to indicate an error (step 503). A positive result to step 501 causes the data processing system to determine if the authorization is subject to an authorization mask (step 507). The authorization is subject to an authorization mask if the authorization is bundled in a role with other authorizations, and the role is associated with an authorization mask. The data processing system performs step 507 by, for example, looking up an authorization mask, as described in FIG. 2C, above. For each bit set in the authorization mask, the corresponding authorization is prohibited to the user as related to his ancestor users. A negative result to step 507 causes the data processing to allow the function (step 513). However, in case of a positive result to step 507, the data processing system determines if the target user of the function is an ancestor of the user (step 511). The data processing system may lookup the ancestors of the user to determine if the target user is an ancestor, for example, as in FIG. 2A. If the target user is not found among the ancestor set, or a target user is not present in the command, the determination is negative. A command such as "rmuser", if correctly entered by the user, will include a target user. In contrast, a command that does not have target users includes, for example, the file list command, "ls". A negative determination causes the data processing system to allow the function (step 513). A positive determination causes the data processing system to display an error (step 503). Processing terminates after steps 503 and 513.

The operation of flowchart 500 may be a detailed description of step 303 of FIG. 3, or step 403 of FIG. 4. Negative results from steps 507 and 511 may permit flowchart 400 to further operate and allow the function in step 405 of FIG. 4.

Thus, illustrative embodiments permit a user to extend a mask to descendants below a child user. The user may be immune to removing or otherwise interfering with permissions previously established for the user, to the extent that the user assigns a recursive mask to a child user. Accordingly, a data processing system may be maintained and may continue to be controlled effectively by users, despite malicious attempts by subordinate users.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for protecting a first user from authorization limitation by a second user, the method comprising:
   a computer receiving an authorization command from the second user, wherein the authorization command targets the first user, and the second user is at least partially authorized to operate the authorization command;
   the computer determining that the first user is an ancestor user of the second user;
   determining whether at least one parent-child relationship between the first user and the second user is associated with an authorization mask, wherein the authorization mask is a logical OR of a command mask with a recursive authorization mask, wherein the recursive authorization mask is associated with an ancestor user of the second user, wherein the recursive authorization mask is associated with a parent-child relationship, wherein the recursive authorization mask is comprised of at least one bit position and the at least one bit position is associated with at least one authorization; and
   responsive to a determination that there is at least one parent-child relationship between the first user and the second user associated with the authorization mask, preventing by the computer operation of code of the authorization command to change the at least one authorization of the first user, wherein the authorization mask indicates suppression of code of the authorization command with respect to targeting the ancestor user of the second user.

2. The computer implemented method of claim 1, wherein the authorization mask is comprised of at least one bit position, the authorization mask is associated with a parent-child relationship and each bit position is associated with an authorization.

3. The computer implemented method of claim 1, wherein computer receiving the authorization command comprises receiving the authorization command with a recursive flag, and wherein the recursive authorization mask is a logical OR of the command mask with a recursive authorization mask of a source user.

4. The computer implemented method of claim 1, wherein receiving the authorization command comprises receiving the authorization command without a recursive flag, and wherein the recursive authorization mask is set to a recursive authorization mask of a source user.

5. The computer implemented method of claim 1, wherein the authorization mask indicates suppression of code of the authorization command to revise authorizations of at least one ancestor of the second user, the authorization mask having at least one bit corresponding to the authorization command, and preventing by the computer operation of code of the authorization command to change an authorization of the first user is based on the mask.

6. The computer implemented method of claim 5, further comprising storing a recursive authorization mask and an authorization mask for the second user in association with the first user and the second user based on the command mask, wherein the first user is a parent user of the second user and the first user is associated within an ancestor set of the second user.

7. A data processing system comprising:
   a bus;
   a storage device connected to the bus, wherein computer usable code is located in the storage device;
   a communication unit connected to the bus;
   a processing unit connected to the bus, wherein the processing unit executes the computer usable code for protecting a first user from authorization limitation by a second user wherein the processing unit further executes the computer usable code to receive an authorization command from the second user, wherein the authorization command targets the first user, and the second user is at least partially authorized to operate the authorization command; determine that the first user is an ancestor user of the second user; determine that at least one parent-child relationship between the first user and the second user is associated with an authorization mask, wherein the authorization mask is a logical OR of a command mask with a recursive authorization mask, wherein the recursive authorization mask is associated with an ancestor user of the second user, wherein the recursive authorization mask is associated with a parent-child relationship, wherein the recursive authorization mask is comprised of at least one bit position and the at least one bit position is associated with at least one authorization; and responsive to a determination that there is at least one parent-child relationship between the first user and the second user associated with the authorization mask, prevent by the computer operation of code of the authorization command to change the at least one authorization of the first user, wherein the authorization mask indicates suppression of code of the authorization command with respect to targeting the ancestor user of the second user.

8. The data processing system of claim 7, wherein the authorization mask is comprised of at least one bit position, the authorization mask is associated with a parent-child relationship and each bit position is associated with an authorization.

9. The data processing system of claim 7, wherein in executing the computer usable code to receive the authorization command, the processing unit further executes the computer usable code to receive the authorization command with a recursive flag, and wherein the recursive authorization mask is a logical OR of the command mask with a recursive authorization mask of a source user.

10. The data processing system of claim 7, wherein in executing the computer usable code to receive the authorization command, the processing unit further executes the computer usable code to receive the authorization command without a recursive flag, and wherein the recursive authorization mask is set to a recursive authorization mask of a source user.

11. The data processing system of claim 7, wherein the authorization mask indicates suppression of code of the authorization command to revise authorizations of at least one ancestor of the second user, the authorization mask having at least one bit corresponding to the authorization command, and executing the computer usable code to prevent is based on the mask.

12. The data processing system of claim 11, further comprising the processing unit executing computer usable code to store the recursive authorization mask and an authorization mask for the second user in association with the first user and the second user based on the command mask, wherein the first user is a parent user of the second user and the first user is associated within an ancestor set of the second user.

13. A computer program product for protecting a first user from authorization limitation by a second user, the computer program product comprising:
one or more computer-readable storage devices;
program instructions, stored on at least one of the one or more storage devices, for receiving an authorization command from the second user, wherein the authorization command targets the first user, and the second user is at least partially authorized to operate the authorization command;
program instructions, stored on at least one of the one or more storage devices, for determining that the first user is an ancestor user of the second user;
program instructions, stored on at least one of the one or more storage devices, for determining whether at least one parent-child relationship between the first user and the second user is associated with an authorization mask, wherein the authorization mask is a logical OR of a command mask with a recursive authorization mask, wherein the recursive authorization mask is associated with an ancestor user of the second user, wherein the recursive authorization mask is associated with a parent-child relationship, wherein the recursive authorization mask is comprised of at least one bit position and the at least one bit position is associated with at least one authorization; and
program instructions, stored on at least one of the one or more storage devices, for preventing operation of code of the authorization command to change an authorization of the first user, responsive to a determination that there is at least one parent-child relationship between the first user and the second user associated with the authorization mask, wherein the authorization mask indicates suppression of code of the authorization command with respect to targeting the ancestor user of the second user.

14. The computer program product of claim 13, wherein the authorization mask is comprised of at least one bit position, the authorization mask is associated with a parent-child relationship and each bit position is associated with an authorization.

15. The computer implemented method of claim 1, further comprising:
receiving by the computer a second authorization command from a descendant user of the second user, wherein a recursive authorization mask of the descendent user indicates suppression of code of the second authorization command, the recursive authorization mask of the descendent user having at least one bit corresponding to the second authorization command.

16. The data processing system of claim 7, wherein the processing unit further executes computer usable code to receive by the computer a second authorization command from a descendant user of the second user, wherein a recursive authorization mask of the descendent user indicates suppression of code of the second authorization command, the recursive authorization mask of the descendent user having at least one bit corresponding to the second authorization command.

17. The computer program product of claim 13, further comprising: program instructions, stored on at least one of the one or more storage devices, for receiving by the computer a second authorization command from a descendant user of the second user, wherein a recursive authorization mask of the descendent user indicates suppression of code of the second authorization command, the recursive authorization mask of the descendent user having at least one bit corresponding to the second authorization command.

* * * * *